United States Patent [19]

Newton

[11] Patent Number: 5,493,856

[45] Date of Patent: Feb. 27, 1996

[54] THRUST REVERSER CONTROL MECHANISM

[75] Inventor: Arnold C. Newton, Derby, England

[73] Assignee: Rolls-Royce plc, London, England

[21] Appl. No.: 358,831

[22] Filed: Dec. 19, 1994

[30] Foreign Application Priority Data

Dec. 24, 1993 [UK] United Kingdom ................ 9326466.1

[51] Int. Cl.$^6$ .................................................. F02K 1/32
[52] U.S. Cl. .................................. 60/226.2; 60/39.041
[58] Field of Search ............................. 60/39.091, 226.2, 60/230, 223; 244/110 B

[56] References Cited

U.S. PATENT DOCUMENTS

| | | | |
|---|---|---|---|
| 3,050,937 | 8/1962 | James et al. | 60/39.091 |
| 4,422,605 | 12/1983 | Fage | 60/39.091 |
| 5,280,704 | 1/1994 | Anderson et al. | 60/226.2 |
| 5,381,654 | 1/1995 | Halin | 60/39.091 |

*Primary Examiner*—Louis J. Casaregola
*Attorney, Agent, or Firm*—Cushman Darby & Cushman

[57] ABSTRACT

A control mechanism for the thrust reverser of an aircraft comprises an open ended conduit, the open end of which operationally protrudes into the airflow over the surface of the aircraft. The airflow over the aircraft creates a partial vacuum within the conduit. A piston is translatable within a cylinder in accordance with the magnitude of the partial vacuum. The position of the piston within the cylinder determines whether the thrust reverser can or cannot be actuated, thereby preventing inadvertent in-flight thrust reverser actuation.

4 Claims, 1 Drawing Sheet

5,493,856

THRUST REVERSER CONTROL MECHANISM

FIELD OF THE INVENTION

This invention relates to a control mechanism for the thrust reverser of a propulsive gas turbine.

BACKGROUND OF THE INVENTION

Propulsive gas turbine engines fitted to aircraft are frequently provided with a thrust reverser. Typically the thrust reverser is a mechanical device which, when operative, deflects at least a portion of the exhaust efflux of the engine in such a direction as to provide retardation of the aircraft carrying the engine. Such retardation is required when the aircraft carrying the engine lands, in order to economise on the use of frictional braking systems. Frictional braking systems, which are usually in the form of disc brakes fitted to the aircrafts wheels, are subject to expensive wear as are the tires of the braked wheels.

While thrust reversers are an attractive alternative or adjunct to frictional methods of aircraft braking, they are potentially hazardous to flight safety if they are inadvertently deployed during flight. Measures are therefore taken to ensure that the possibility of this happening is minimized. Typically, such measures include providing the aircraft's undercarriage with electrical switches which indicate whether the aircraft is on the ground. The switches are linked to the control systems of the aircraft's engines so that the thrust reversers are disabled when the aircraft is not on the ground. However such switches and their associated equipment are expensive.

SUMMARY OF THE INVENTION

It is an object of the present invention to provide an alternative and simple control mechanism for a gas turbine engine thrust reverser.

According to the present invention, a control mechanism for the thrust reverser of an aircraft mounted gas turbine engine comprises means adapted to detect forward motion of the aircraft which incorporates said engine and provide an output signal in accordance with the magnitude of said forward motion, and means responsive to said output signal to prevent the operation of said thrust reverser when the forward air speed of said aircraft is within a predetermined range of values.

Said means adapted to detect forward motion of said aircraft may comprise an open ended conduit which operationally protrudes into the airflow over the surface of said aircraft and is so aligned that said airflow creates a partial vacuum within said conduit during said aircraft forward motion to constitute said output signal.

Preferably said means responsive to said output signal comprises a piston translatable within a cylinder which is in communication with said conduit, said piston being translatable in accordance with the magnitude of said partial vacuum between a first position in which it interacts with the actuation mechanism of said thrust reverser to prevent actuation thereof and a second position in which it interacts with the actuation mechanism so as not to prevent acutation thereof.

BRIEF DESCRIPTION OF THE DRAWINGS

The present invention will now be described, by way of example, with reference to the accompanying drawings in which.

DETAILED DESCRIPTION OF THE INVENTION

Figure 1:
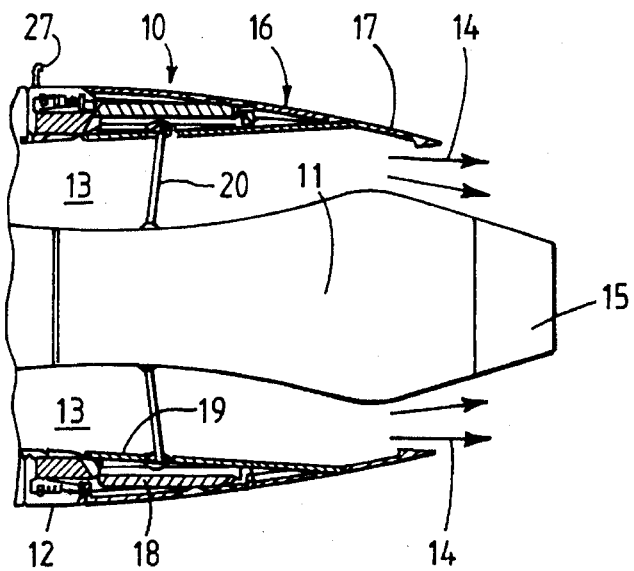
FIG. 1 is a sectioned side view of the rear portion of a gas turbine engine having a thrust reverser which incorporates a control mechanism in accordance with the present invention.

Referring to FIG. 1, the rear portion 10 of an aircraft mounted ducted fan gas turbine engine comprises a gas generator core 11 which is surrounded in radially spaced apart relationship by an annular nacelle 12. An annular gas passage 13 is thereby defined between the core 11 and nacelle 12. The gas passage 13 contains the air which has been accelerated by the fan (not shown) mounted at the front of the engine and which is driven by the core 11. That air is exhausted from the downstream end of the nacelle 12, as indicated by the arrows 14, to provide propulsive thrust. Additional propulsive thrust is provided by the hot gas exhaust from the nozzle 15 provided at the downstream end of the core 11.

Figure 2:
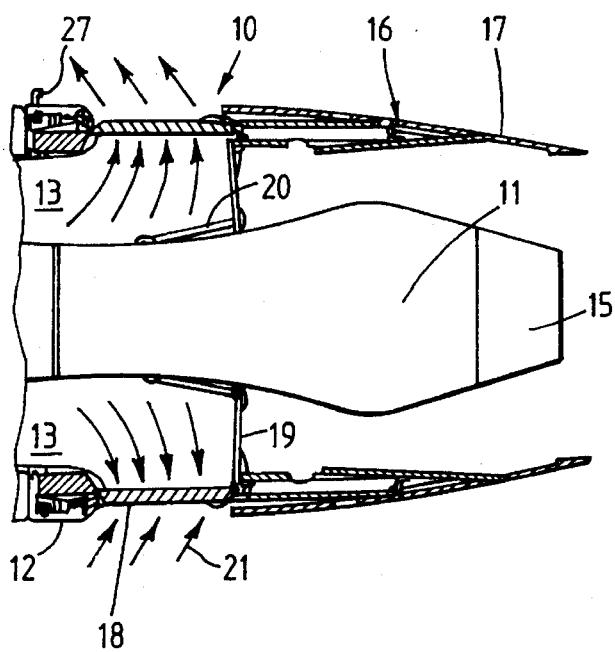
FIG. 2 is a view similar to that shown in FIG. 1 in which the thrust reverser is shown in the deployed position.

The rear portion of the nacelle 12 incorporates a thrust reverser generally indicated at 16. The thrust reverser 16 is of conventional configuration and is adapted, when deployed, to deflect the fan airflow from the passage 13 in order to achieve retardation of the aircraft on which the engine is mounted. During normal flight, the thrust reverser 16 is in the position shown in FIG. 1. However, when the aircraft carrying the engine lands and requires retardation, the thrust reverser 16 is deployed as shown in FIG. 2. This is achieved by the rearward translation of the downstream end 17 of the nacelle 12 to reveal an annular array of forward facing deflector vanes 18 in the wall of the nacelle. Simultaneously, a plurality of doors 19 which previously defined part of the radially inner surface of the nacelle 12 pivot from the downstream end 17 of the nacelle 12 into positions in which they block the passage 13. They are caused to do this by a series of links 20 which are each pivotally attached to the core 11 and the doors 19. Blockage of the passage 13 by the doors 19 forces the fan airflow through the deflector vanes 18 so that the airflow is deflected in a generally forward direction as indicated by the arrows 21.

The thrust reverser 16 is actuated by the use of hydraulic power. Thus a hydraulic pump (not shown) driven by the gas generator core directs pressurised hydraulic fluid through appropriate pipes to a series of hydraulic motors (not shown). The motors drive a series of screw jacks (not shown) which provide the previously described translation of the downstream end 17 of the nacelle 12. Such drive mechanisms are well known to those skilled in the art and will not, therefore, be described in further detail.

Figure 3:
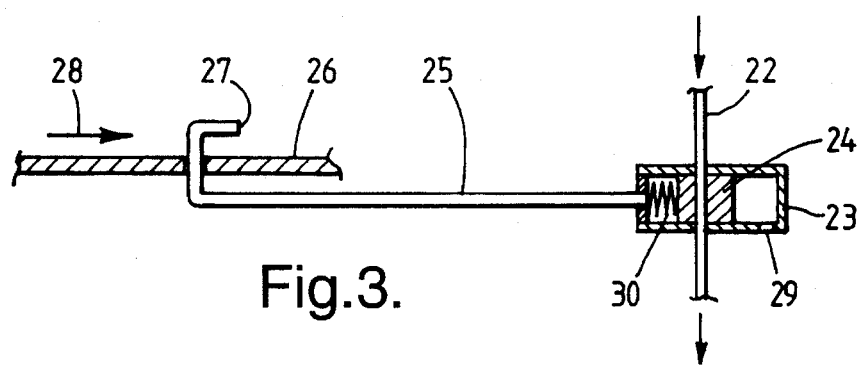
FIG. 3 is a view, in diagrammatic form, of a thrust reverser control mechanism in accordance with the present invention.

A short length of the main hydraulic pipe to the hydraulic motors can be seen if reference is now made to FIG. 3. The hydraulic pipe portion, which is indicated by the number 22, passes through cylinder 23. However, the part of the pipe portion 22 which is within the cylinder 23 is defined by a piston 24 which is translatable within the cylinder 23. It will be seen therefore that the piston 24 is translatable between positions in which hydraulic fluid is able to flow through the pipe portion 22 and positions in which it is not.

One end of the interior of the cylinder 23 is in communication with a conduit 25 which extends from the cylinder 23 to the external skin 26 of the nacelle 12. In fact the open end 27 of the conduit 25 protrudes into the air flow 28 which operationally flows over the external surface of the nacelle 12 as can also be seen in FIGS. 1 and 2. The conduit open end 27 is directed in the same direction as that in which the air flow 28 generally flows. This brings about the creation of a partial vacuum within the conduit 25. Since the conduit 25 is in communication with the interior of the cylinder 23, the partial vacuum acts upon the piston 24. The piston 24 is consequently drawn towards the end of the cylinder 23 which is in communication with the conduit 25. A hole 29 in the opposite end of the cylinder 23 ensures that the opposite end of the piston 24 is exposed to atmospheric pressure to facilitate such translation.

A compression spring 30 is interposed between the piston 24 and the end of the cylinder 23 which receives the conduit 25. This provides a restoration force in opposition to the force on the piston 24 resulting from the partial vacuum within the conduit 25.

It will be seen therefore that as the velocity of the airflow 28 over the exterior of the nacelle 12 changes, with changes in aircraft speed, there are corresponding changes in the magnitude of the partial vacuum within the conduit 25. This in turn causes corresponding translation of the piston 24 against the restoring force exerted by the compression spring 30.

The compression spring 30 and various appropriate stops (not shown) within the cylinder 23 are so arranged that the hydraulic pipe portion 22 is only aligned with the part thereof which passes through the piston 24 when the velocity of the airflow 28 is less than a predetermined value. That predetermined value corresponds with the maximum air speed at which the aircraft carrying the engine is likely to travel along a runway. If the velocity of the airflow 28 is greater than that value, the piston 24 moves out of alignment with the hydraulic pipe portion 22, thereby cutting off hydraulic power to the thrust reverser 16. The effect of this is that if the thrust reverser 16 is commanded to deploy when the aircraft is travelling along a runway, it will deploy. However if the thrust reverser 16 is commanded, either deliberately or inadvertently, to deploy when the aircraft is airborne, it will not obey that command.

Although the present invention has been described with reference to a thrust reverser control mechanism in which the thrust reverser is prevented from operating if the forward air speed of the aircraft is greater than a predetermined value, it will be appreciated that other constraints could be applied if desired. For instance, the thrust reverser could also be prevented from operating if the forward air speed of the aircraft is below a predetermined value. This, for instance would prevent inadvertent thrust reverser operation when the aircraft is travelling slowly down a runway prior to take off.

The present invention therefore provides a single means for controlling the operation of a thrust reverser which provides protection against inadvertent deployment.

I claim:

1. A control mechanism for the thrust reverser of an aircraft mounted gas turbine engine comprising means responsive to the air flow over the aircraft as a measure of the forward motion of the aircraft which incorporates said engine and providing an output signal in accordance with the magnitude of said forward motion, and means responsive to said output signal to prevent the operation of said thrust reverser when the forward air speed of said aircraft is within a predetermined range of values.

2. A control mechanism for the thrust reverser of an aircraft mounted gas turbine engine as claimed in claim 1 wherein said means responsive to forward motion of said aircraft comprises an open ended conduit which operationally protrudes into the airflow over the surface of said aircraft and is so aligned that said airflow creates a partial vacuum within said conduit during said aircraft forward motion to constitute said output signal.

3. A control mechanism for the thrust reverser of an aircraft mounted gas turbine engine as claimed in claim 2 wherein said means responsive to said output signal comprises a piston and a cylinder, the piston being translatable within the cylinder, which piston and cylinder are in communication with said conduit, said piston being translatable in accordance with the magnitude of said partial vacuum between a first position in which it interacts with the actuation mechanism of said thrust reverser to prevent actuation thereof and a second position in which it interacts with the actuation mechanism so as not to prevent actuation thereof.

4. A control mechanism for the thrust reverser of an aircraft mounted gas turbine engine as claimed in claim 3 wherein said thrust reverser is hydraulically actuated, said translatable piston being adapted to interrupt the hydraulic system of said thrust reverser in said first position so as to prevent actuation of said thrust reverser.

* * * * *